Figure 1:
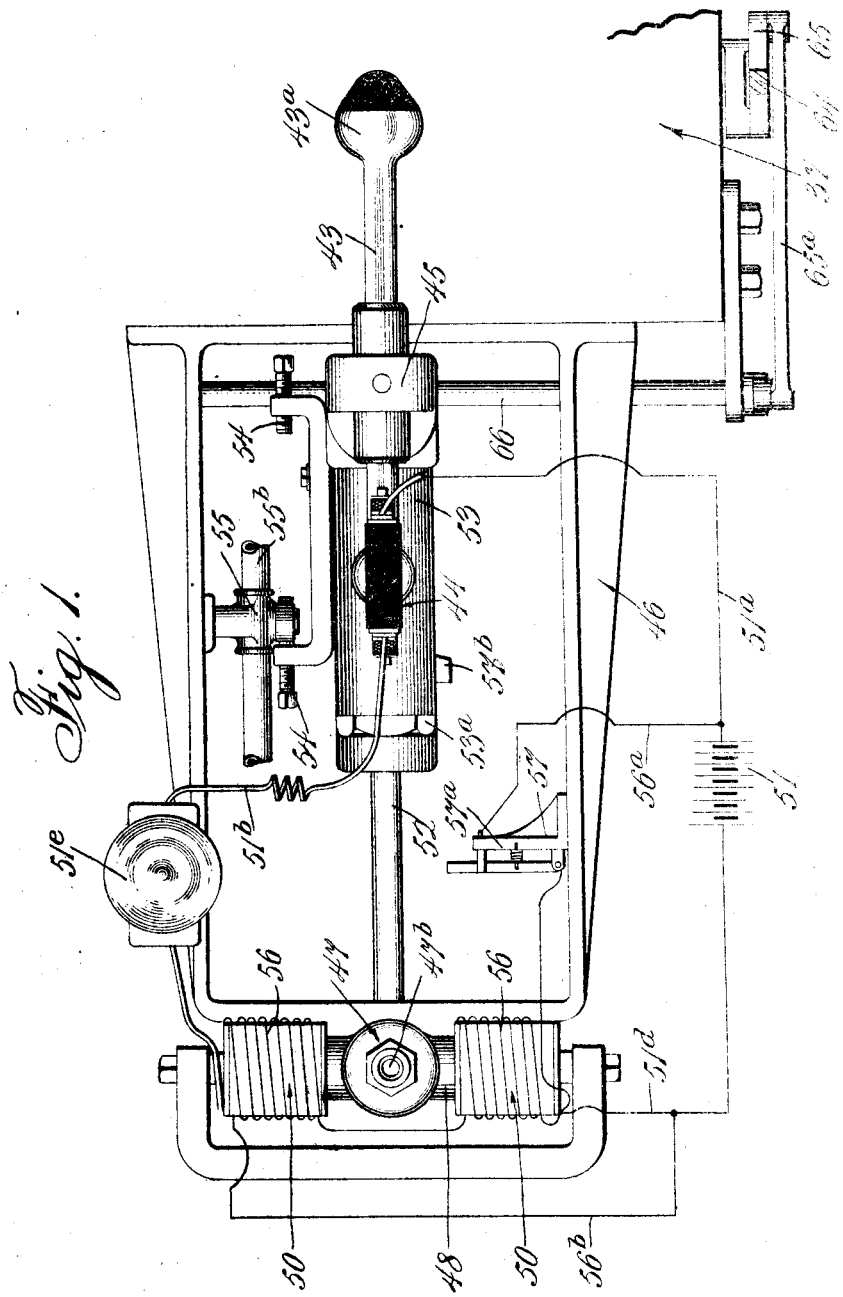

O. A. HANFORD.
GATHER ACTUATED CONTROLLER FOR GLASS BLOWING MACHINES.
APPLICATION FILED FEB. 17, 1912.

1,123,524.

Patented Jan. 5, 1915.

4 SHEETS—SHEET 1.

Witnesses
Albert L. Krey
Alvie B. Weber

Inventor
Orin A. Hanford
by Fenwick Dorsey
his Attorney

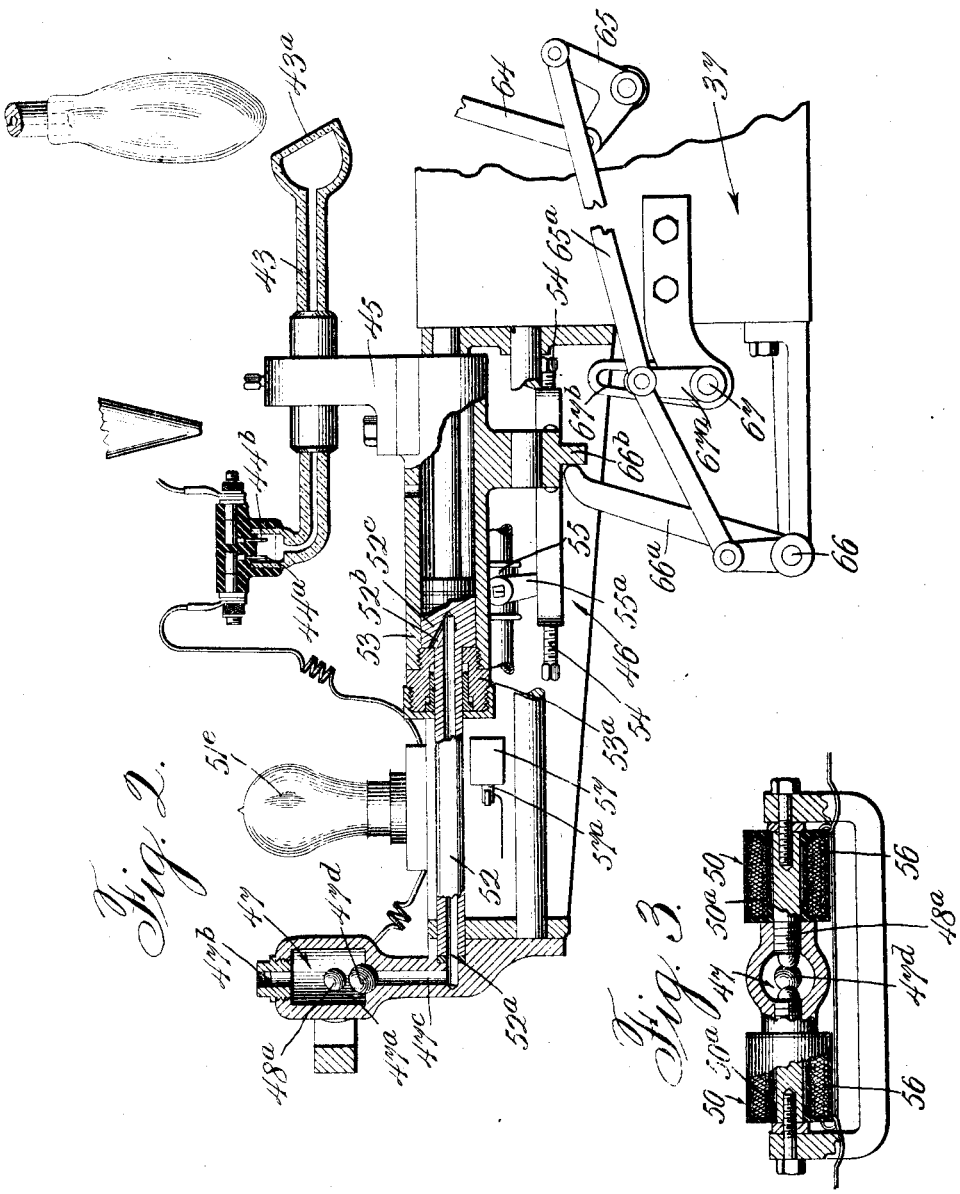

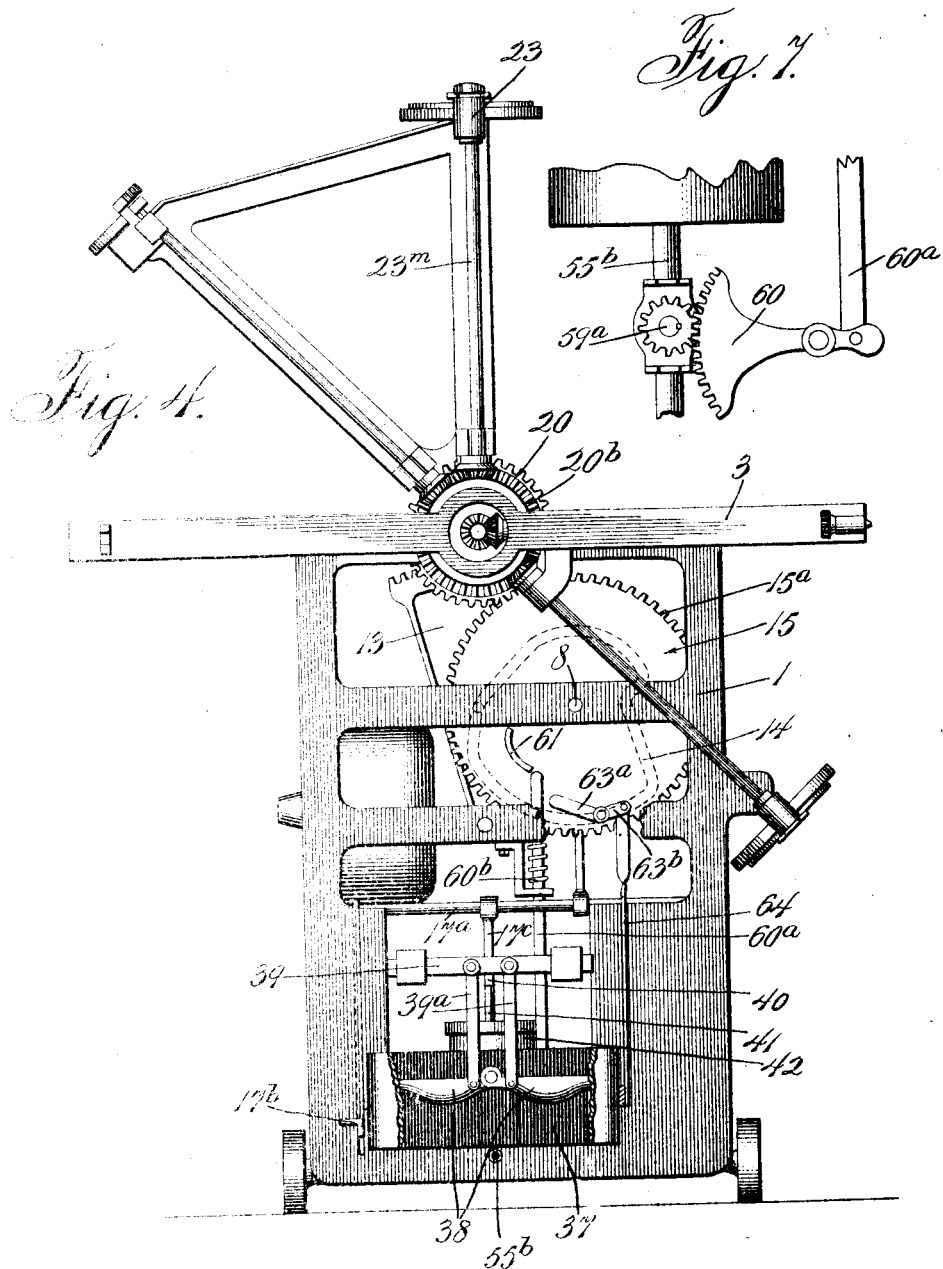

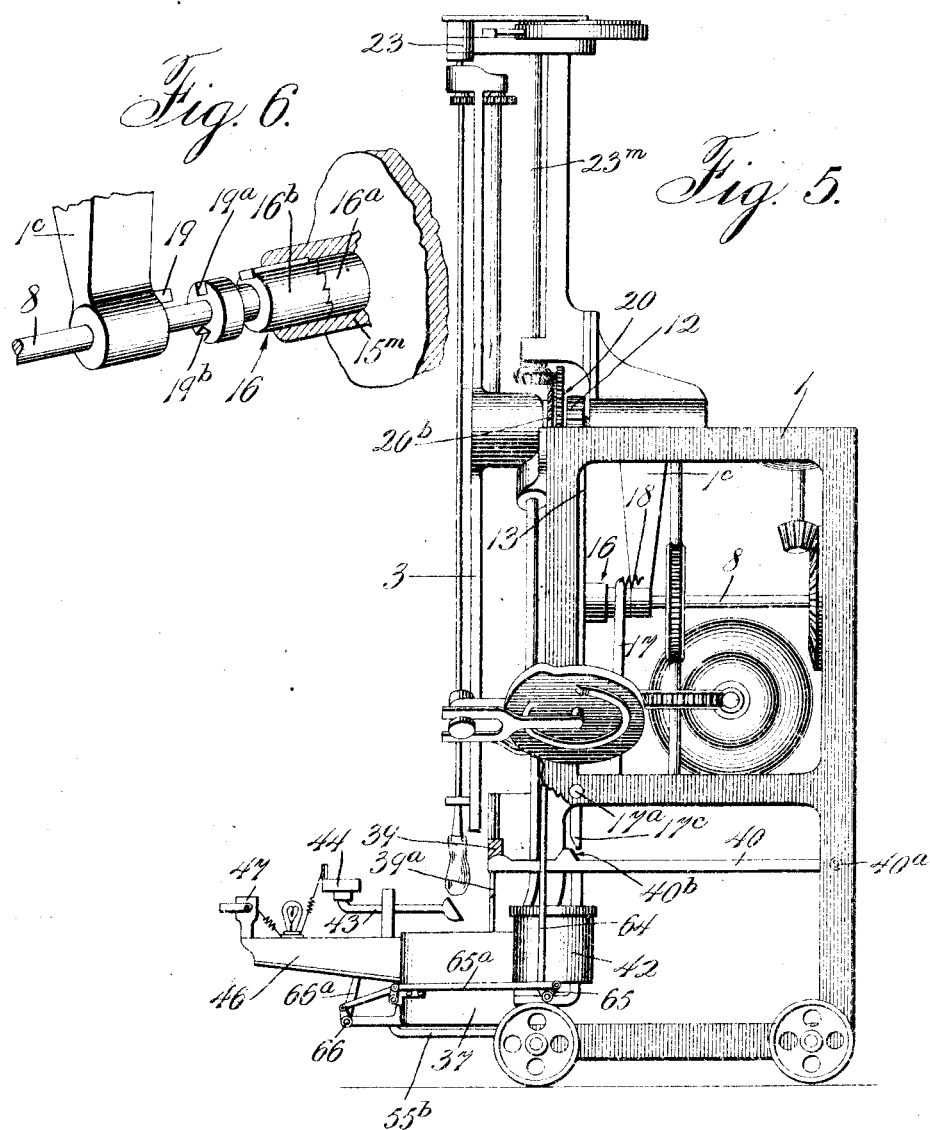

UNITED STATES PATENT OFFICE.

ORIN A. HANFORD, OF ROCHESTER, NEW YORK, ASSIGNOR TO EMPIRE MACHINE COMPANY, OF PORTLAND, MAINE, A CORPORATION OF MAINE.

GATHER-ACTUATED CONTROLLER FOR GLASS-BLOWING MACHINES.

1,123,524.  Specification of Letters Patent.  Patented Jan. 5, 1915.

Application filed February 17, 1912. Serial No. 678,231.

*To all whom it may concern:*

Be it known that I, ORIN A. HANFORD, a citizen of the United States of America, and a resident of Rochester, New York, have invented certain new and useful Improvements in Gather-Actuated Controllers for Glass-Blowing Machines, of which the following is a specification.

My invention relates to certain improvements in glass blowing machines. whereby the molds are automatically closed upon the gather by mechanism controlled by the elongation of the gather. In it the automatic actuation of the mechanism in blowing and molding follows the positioning of the blowpipe vertically over the mold after an interval which is sufficient to permit the proper elongation of the gather, which interval for each gather varies with the condition thereof as to mass, temperature, etc. These may vary considerably in successive gathers under certain circumstances and this application shows and claims an automatic controlling mechanism for the blowing and molding, dependent not upon the presumed condition of the gather, but upon the action of the particular gather being handled at the time.

The controller is shown in this application in the form of a thermostatic contact maker which is heated by the gather upon its elongation and which controls through proper instrumentalities the closing of the mold and such operations of the machine as follow thereafter. To secure the proper and desirable action of a machine having the general nature of the invention before described, numerous subsidiary features have been devised and the invention therefore consists in the construction, arrangement and combination of the several parts of which it is composed as will be hereinafter more fully described and claimed, although it is obvious that the broad invention may be embodied in different types of machines.

For clearness the invention will be described solely with reference to the accompanying drawings and without reference to modifications thereof, which while embodying its principle of operation employ equivalent structures, as such changes will be obvious to those skilled in the art and it is not to be understood that by said specific description of the means employed to produce results specified the invention is restricted to the described instrumentalities. When the invention is considered to reside in the specific means, specific claims will be made thereto.

Referring to the accompanying drawings in which corresponding parts are designated by corresponding marks of reference: Figure 1 is a plan view of my automatic controller. Fig. 2, is a vertical longitudinal section therethrough partly in elevation. Fig. 3 is a horizontal sectional view of the electric ball valve. Fig. 4 is a front elevation, partly diagrammatic, of a blowing machine to which my invention may be applied, its thermotic device being removed for purpose of illustration. Fig. 5 is a side elevation partly in section of the same, showing the thermotic device in place and with the blow-pipe in vertical position. Fig. 6 is a detail view of the clutch. Fig. 7 is a detailed view of the auxiliary three way or mold opening valve gearing.

In a prior application filed October 27, 1909, Serial Number 524,994, I have shown a glass blowing machine, comprising a pivoted blow-pipe frame, molding and blowing mechanism, a marverer, a motor and means driven by the motor whereby the blow-pipe frame, after the insertion of a blow-pipe therein, is swung on its pivot to a vertical position with the gather end down into coöperative relation with the mold for elongation and molding, and after blowing is swung back to normal position, the driving connection between the motor and frame being controlled by a clutch mechanism which is normally open, and is closed at the initiation of the operations of the machine, is opened when the blow-pipe is positioned for elongation, is again closed at molding and is finally opened when the blow-pipe has been restored to normal position, and I have shown my present invention applied to a machine of this type, for the purpose of closing the clutch mechanism after the proper period of elongation, the specific form of machine represented in the accompanying drawings being that shown in an application of Vernon M. Dorsey, filed February 17, 1912, Serial No. 678,235.

As shown this machine comprises a suitable frame 1, on which is mounted to oscillate in a vertical plane, a blow-pipe frame 3, the described movements of the latter being due to the engagement existing between a gear 12 thereon and rack segment 13, pivoted in the machine frame and oscillated by a cam track 14 in a disk 15, the shape of the cam being such that the rack segment will be swung by the rotation of the disk to give the desired movements to the blow-pipe frame. The cam disk is driven from a drive shaft 8, through a clutch 16, the latter comprising a toothed portion 16$^a$ fast on the shaft 8 in the rear of the disk 15, and a second toothed portion 16$^b$ sleeved on the shaft 8 and feathered in the rearwardly projecting tubular hub 15$^m$ of the disk and adapted to be engaged with the portion 16$^a$ by a yoke lever formed by an arm 17 projecting from a rock shaft 17$^a$ extending transversely across the main frame near the front thereof, the shaft being adapted to be rocked to engage the clutch members by a foot lever or pedal 17$^b$ extending downwardly and forwardly from one end thereof or by a crank arm 17$^c$ projecting downwardly from the central portion of the rock shaft and actuated in the manner to be hereinafter described. The clutch members are normally held disengaged by means of a spring 18 acting upon the yoke lever 17, but when engaged by the lever are adapted, after the movable member has been moved through a limited arc by the rotation of the shaft 8, to be held in engagement for a predetermined angular movement by means of a pin 19 fixed to the intermediate bearing 1$^c$ of the shaft 8, which pin normally enters a recess or cutaway portion 19$^a$ on the back end of the movable member of the clutch, a raised portion of such rear end being brought opposite the pin by the rotation of the clutch member, whereby the parts will be held in engagement until a second recess 19$^b$ comes opposite the pin, permitting the spring 18 to disengage the clutch members. Upon the members being again engaged by the yoke lever they will in the same manner be held in engagement until the first recess 19$^a$ again comes opposite the pin, when the clutch members will again be disengaged. As before stated the recess 19$^a$ is so situated in respect to the pin that the latter enters it when the parts are in normal position, that is to say when the disk 15 is so situated that the blow-pipe frame is horizontal, while the recess 19$^b$ is so situated in respect to the recess 19$^a$ as to be engaged by the pin 19 when the disk is so situated that the stud roller on the rack segment is in such portion of the cam run thereof that the blow-pipe frame is vertical.

To the base of the machine and in front thereof is secured the water trough 37 in which is pivotally mounted a pair of separable mold parts 38 each of which are connected by a link 39$^a$ with a cross head 39 guided in the main frame. Beneath the central part of the cross head lies the forward end of the lever 40, the rear end of which is pivoted in the main frame at 40$^a$ and which rests upon the plunger 41 of the air cylinder 42, the arrangement being such that when air is admitted to the air cylinder the plunger will be lifted, carrying up the cross head and closing the mold. A beveled lug 40$^b$ is formed upon the upper face of the lever in position to contact with the depending arm 17$^c$ of the clutch actuating rock shaft 17, the arrangement of these parts being such that when the lever is raised to close the molds the shaft will be rocked and the clutch engaged for its final movement.

Above the pivotal point of the blow-pipe frame is mounted an air head 23, adapted to coöperate with the blow-pipe when in vertical position, and as shown in the said application of Dorsey suitable means for controlling the admission of air and for rotating the blow-pipe in the frame may be associated therewith, such air controlled means being actuated by a shaft 23$^m$, driven by beveled teeth 20$^b$ upon the gear 20, which is sleeved on the trunnion of the blow-pipe frame and is driven by the gear teeth 15$^a$ upon the disk 15.

The mechanism above described provides means whereby a blow-pipe, when inserted in the machine and the clutch initially closed by the pressure of the foot of the operator, is swung on a horizontal axis through a proper angular movement whereby the blow-pipe is oscillated to cause a movement of the gather and to position vertically for elongation and molding. The action initiated by the foot of the operator now ceases by reason of the fact that the clutch becomes disengaged due to the recess 19$^b$ therein, coming opposite the pin 19. For the purpose of causing the subsequent action of the machine to be automatic however and to follow without human interposition I provide means by which the mold will be closed and such subsequent action of the machine may be carried out as may be necessary to complete the molding, such means being not dependent upon the setting or timing of any parts but coming into action automatically at a time dependent upon the elongation of the gather. Inasmuch as this period of elongation varies due to the size of the gather, the temperature of the glass from which it is made and the atmospheric conditions by which it is cooled during its manipulation, it is difficult in fine work to predetermine the interval which should be allowed for the elongation. By closing the mold by the elongation of the gather these defects are overcome. To accomplish this desirable result mechanism has been devised which when the gather has reached a predetermined elongation automatically restarts the action of the machine. In this application such automatic mold closing means, comprising a thermal mechanism which admits air to the mold closing cylinder 42 and by lifting the lever 40 reëngages the clutch by which the air for blowing is controlled and the machine brought into operation to complete its cycle of motion, is shown in detail in Figs. 1 to 3. This mechanism is as follows: A tube 43 contains mercury, the forward end of the tube being enlarged into a bulb 43$^a$ and blackened to increase its sensitiveness while its rear end is bent upwardly and receives a cap 44 in which are mounted two contact points 44$^a$, 44$^b$ insulated from each other and projecting within the bore of the tube slightly above the normal level of the mercury contained therein. The tube 43 is carried in a sliding head 45 mounted upon a bracket 46 from the front side of the mold tank 37 and when such sliding frame is thrown rearwardly the bulb of the thermal tube thereon lies in or adjacent to the path of the descending gather. In the forward end of the bracket is contained an air valve 47 comprising a valve chamber 47$^a$, inlet and outlet ports 47$^b$ and 47$^c$ and a ball valve 47$^d$ for the latter. The two poles 48$^a$ of an electro-magnet 48 project into the valve chamber above the ball valve, the said magnet being energized by coils 50. As shown diagrammatically in Fig. 1 and in Fig. 2 the main circuit of these coils comprises a suitable source 51, the wire 51$^a$, the points 44$^b$, 44$^a$, the wire 51$^b$, the coils 50 of the magnet 48 and the wire 51$^d$ connecting the coils and the source of current. If desired an indicating device, such as a lamp 51$^c$, may be inserted within the circuit for the purpose of making a visual indication of the closing of the circuit. The outlet port 47$^c$ communicates with the central bore 52$^a$ of the tubular piston rod 52 rigidly mounted in the bracket 46, the rear end of which piston has a communication through the port 52$^b$ with the forward side of the piston head 52$^c$, which latter is contained within a cylinder 53 forming part of the sliding head 45 and having a closed forward end 53$^a$. The sliding head 45 is provided with two adjustable striking pins 54 which actuate the arm 55$^a$ of the main air valve 55, interposed in the pipe 55$^b$ between a source of air under pressure (not shown) and the mold closing cylinder 42. With this construction it will be seen that the gather in its elongation will by radiation heat the bulb 43$^a$ upon the forward end of the tube 43 and cause the expansion of the contents thereof to close the gap between the points 44$^a$ and 44$^b$, whereby current will flow through the windings 50$^a$, energizing the electro-magnet and lifting the ball valve from its seat, whereby air under pressure will be admitted from a suitable source through the outlet port 47$^c$ and the tubular piston 52 to the front of the piston head 52$^c$ and act upon the closed forward end of the cylinder 53 to shove the sliding head 45 forwardly. This movement of the head will bring one of the pins 54 into contact with the arm 55$^a$ of the main air valve and open the latter to admit air to the base of the mold closing cylinder to lift the lever 40 and reëngage the clutch.

Inasmuch as it is desirable that the thermal closer be very sensitive and as under these conditions it is possible that the cooling of the mercury will take place so rapidly as to again break the circuit before the sliding head has completed its forward movement it is advisable to provide means whereby the movement of the head when initiated by the expansion of the mercury will be completed independently of the subsequent cooling thereof. This is accomplished by placing upon the coils of the magnets a second winding 56 included in a normally closed circuit, the magnetization due to the current flowing therethrough being insufficient however to lift the ball from its seat, but being sufficient to maintain it raised after it is lifted by the stronger field created by the windings 50$^a$. This normally closed circuit is shown diagrammatically in Fig. 1 as comprising the conductors 56$^a$ and 56$^b$ connecting the windings 56 with the source 51, a cut-out 57 being inserted in one (56$^a$) of the said conductors. This cut-out comprises a spring pressed normally closed contact part 57$^a$ which has a portion extending into the path of the projection 57$^b$ on the sliding head 45, so that as the head completes its forward motion the auxiliary circuit through the winding 56 will be broken and the ball valve 47$^d$ be allowed to drop. The forward motion of the sliding head above described removes the bulb from proximity to the descending gather and permits the cooling of the mercury in the tube, which may be aided by a nozzle 58, shown diagrammatically in Fig. 2, from which a current of cooling air may be directed upon the bulb when the latter is in its forward position.

The reëngagement of the clutch, due to the lifting of the plunger 41, causes the disk 15 to again start its rotation for the purpose of admitting blowing air during the molding and to subsequently move the blow-pipe supporting frame back to normal position, but the mold must be opened before the frame is moved. For the purpose of effecting this opening of the mold a three way valve 59 is inserted in the air pipe 55$^b$ between the main valve 55 and the mold closing cylinder 42. This mechanism is shown in detail in Fig. 7 and the arrangement thereof is such that the valve normally leaves the pipe 55$^b$ unobstructed, but such valve is actuated by the rotation of the disk 15 after the closing of the mold, to obstruct such pipe, and act as a relief valve for the mold closing mechanism." The main valve thus acts as the mold closing valve while the three way valve acts as a mold opening valve. This movement of the three way valve is accomplished by gearing the stem 59ª thereof with a pivoted segment 60, the tail of which is connected to the lower end of a push pin 60ª, the upper end of which is in proximity to the main disk 15, which is provided with a cam lug 61, adapted at a proper time to depress the said pin and to thus move the three way valve to obstruct the pipe 56 in the manner before described. The position of the cam track 61 upon the disk determines the time the mold is opened, the rotation of the disk after the main valve has been closed by the mechanism to be hereinafter described, permitting the valve actuating spring 60ᵇ to restore the three way valve to its initial position in which the pipe is placed in uninterrupted communication with the interior of the mold closing cylinder. The molds are opened by their weight and if necessary the parts may be weighted to insure their prompt action.

For the purpose of restoring the thermal tube 43 to its normal position and in proximity to the path of the descending gather a pin 62 is located upon the front of the disk 15 and in position to contact during the final movement of the disk with one arm 63ª of a bell crank lever pivoted in the main frame, the other arm 63ᵇ of which lever is connected by a link 64 with the bell crank lever 65 at the base of the frame 1, through which motion is imparted to the forwardly extending link 65ª to rock the rock shaft 66, this last named shaft carrying a tappet arm 66ª adapted to engage a projection 66ᵇ upon the sliding head 45 to throw the latter rearwardly. In order to provide variation in length of throw a supplemental bell crank mechanism embodying the crank arms 67ª and 67ᵇ and the rock shaft 67 is employed. This rearward motion of the sliding head also effects the closing of the main air valve 55 and thus all parts of the automatic controller are restored to normal position.

In operation of the device here shown the workman having placed a blow-pipe with a gather of glass thereon in the blow-pipe frame, while the latter is in horizontal position, depresses the pedal 17ᵇ, thus effecting the initial engagement of the clutch and causing the initial movement of the main disk 15, which through its cam track oscillates the blow-pipe frame in its pivot to position the blow-pipe vertically and in coöperative relation with the mold and blowing mechanism. At this time the clutch 16 is disengaged by the recess 19ª coming opposite the pin 19 and the main disk and all parts driven thereby temporarily cease their movement and remain at rest until the elongation of the gather brings it in sufficiently close proximity to the bulb of the thermal device to cause an expansion of the mercury contained therein, whereby the circuit of the actuating windings 50 of the valve actuating magnet will be energized to open the electric valve and air will be admitted to the cylinder 53 of the sliding frame 45 to drive the latter forwardly, removing the bulb of the thermal device out of the path of the gather and the path in which the mold closes. This movement of the sliding frame also opens the main valve 55 of the pipe 55ᵇ to the mold closing cylinder, the plunger of which is driven upwardly, lifting the lever 40 and with it the cross head 39 to close the mold. The lifting of the lever as before described results in a reëngagement of the clutch 16 and a restarting of the main disk 15. This latter results in the proper actuation of the air head 23, whereby air is admitted to the interior of the gather to expand the same within the mold. No motion is at this time however imparted to the blow-pipe frame by reason of the fact that the stud of the actuating segment is still within a concentric molding run of the main disk, but before such stud leaves such run the cam track 61 upon the said disk actuates the push pin 60ª of the auxiliary three way relief valve 59 of the mold closing cylinder and relieves the air pressure in the interior thereof, permitting the plunger to descend and the molds to open. The continued movement of the main disk then through the segment swings the blow-pipe frame to normal position. During this swing of the blow-pipe frame to normal position the pin 62 upon the main disk actuates the resetting bell crank 63ª and 63ᵇ and throws the sliding frame 45 rearwardly, closing the main air valve 55 to the mold closing cylinder and subsequent thereto the cam track 61 upon the main disk 15 passes from off the push pin 60ª of the three way valve and permits the spring of the latter to restore the said valve to its normal position, in which the air source is connected with the interior of the said cylinder. When the blow-pipe frame is swung back to its initial position the clutch is a second time disengaged by the first recess 19ª thereof coming opposite to the pin 19 and the main disk and parts driven thereby are again stopped. The blow-pipe with the finished bulb thereon may now be removed from the frame and a blow-pipe with a fresh gather inserted therein.

I do not in this application broadly claim a controller, actuated by the heat or elongation of the gather for putting into operation glass blowing or molding mechanisms as claims are made thereto in my other application, serially numbered 601234, filed Jan. 6, 1911, as a division of my aforesaid application serially numbered 524994, and as the claims of this application are restricted to include automatic means for closing a mold, I do not, by failure to make herein claims not including automatic mold closing means, abandon the same, as such claims are reserved for my prior application, Serial Number 524,994 before recited.

Having thus described my invention what I claim is:—

1. In a mold closing device for glass working machines, the combination with a separable mold, of means for closing the mold, means for supporting a body of glass for elongation above the mold and a thermotic element actuated by the heat of the body of glass and controlling the operation of the mold closing means.

2. In a mold closing device for glass working machines, the combination with a separable mold, of mold closing mechanism therefor, means for supporting a body of glass for elongation above the mold, an electric circuit, a thermotic contact maker actuated by the heat of the body of glass and controlling the circuit and a valve controlled by the circuit containing the contact maker for governing the operation of the mold closing mechanism.

3. In a mold closing device for glass molding machines, the combination with a separable mold, of a fluid controlled mold closing mechanism, a thermotic contact maker comprising a mercury column adapted to be expanded by the heat of a gather on the elongation thereof, contacts, and a valve having magnets governed by the passage of current through the contact and controlling the application of fluid to the mold closing mechanism.

4. In a mold closing device for glass working machines, the combination with a separable mold, of mold closing mechanism, means for supporting a body of glass for elongation above the mold, a thermotic contact maker actuated by the heat of the body of glass and a circuit controlled thereby determining the operation of the mold closing mechanism.

5. In a mold closing mechanism for glass molding machines, the combination with a separable mold, of mold closing mechanism therefor, a movable thermotic element, means for retracting the said element from proximity to a descending gather and for determining the operation of the mold closing mechanism upon the heating of the said element by the gather.

6. In a mold closing mechanism for glass molding machines, the combination with a separable mold, of means energized by the elongation of a heated gather for closing the said mold and for retracting the said last named means from proximity to the path of the descending gather, when the same has been energized by the gather.

7. In a mold closing device for glass molding machines the combination with a separable mold, of means for closing the mold, movable means controlled by the elongation of a gather for controlling the operation of the mold closing means, and for retracting the gather actuated means from proximity to the path of the gather and means for automatically reopening the mold and moving the gather actuated means back to normal position.

8. In a glass blowing machine, the combination with a blow-pipe, of a separable mold, movable means located adjacent to and controlled by the elongation of a gather on the blow-pipe for closing the mold thereon and for retracting the said means.

9. In an automatic mold closing device for glass molding machines controlled by the elongation of a gather, the combination with a separable mold, of an air cylinder closing the said mold, a movable frame, a fluid pressure operating device and a valve controlling the same for actuating the frame, a thermotic tube mounted in the said frame and containing expansible conducting materials, a magnetic port closing part and an electromagnet, an electric circuit including the expansible conducting material and a winding on the said magnet, a second electric circuit comprising a contact opened by the movement of the frame, a contact maker and a winding on the electric magnet for maintaining the port closing part in its open position, an air connection controlled by the valve for moving the frame to retract the thermotic tube from proximity to the gather, air connections to the mold closing cylinder and a valve therein opened by the retraction of the said frame and means for subsequently restoring the said frame to its initial position.

In testimony whereof I have hereunto signed my name in the presence of two witnesses.

ORIN A. HANFORD.

In presence of—
ZORA B. SAUNDERS,
G. K. SANSWIRN.